United States Patent [19]

Ota et al.

[11] Patent Number: 5,883,820
[45] Date of Patent: Mar. 16, 1999

[54] COMPUTER SYSTEM

[75] Inventors: Hiroichi Ota, Tokyo; Shingo Ono, Higashimurayama, both of Japan

[73] Assignee: Citizen Watch Co., Ltd., Tokyo, Japan

[21] Appl. No.: 870,701

[22] Filed: Jun. 6, 1997

Related U.S. Application Data

[63] Continuation of Ser. No. 371,560, Jan. 11, 1995, abandoned.

[30] Foreign Application Priority Data

Jan. 13, 1994 [JP] Japan .................... 6-014111

[51] Int. Cl.$^6$ .................................................. G06F 1/16
[52] U.S. Cl. .................................................. 364/708.1
[58] Field of Search .................... 364/704, 705.01, 364/705.06, 708.01, 710.01, 710.13; 361/680, 683, 684, 685, 686, 687

[56] References Cited

U.S. PATENT DOCUMENTS

| | | | |
|---|---|---|---|
| 4,736,332 | 4/1988 | Crease | 364/708.1 |
| 4,769,764 | 9/1988 | Leavnon | 361/680 |
| 4,788,658 | 11/1988 | Hanebuth | 361/684 |
| 4,790,431 | 12/1988 | Reel et al. | 312/223.2 |
| 4,837,590 | 6/1989 | Sprague | 346/145 |
| 4,896,776 | 1/1990 | Kabanuk et al. | 202/576 |
| 4,903,222 | 2/1990 | Carter et al. | 361/680 |
| 4,978,949 | 12/1990 | Herron et al. | 345/168 |
| 5,010,988 | 4/1991 | Brown | 190/104 |
| 5,030,128 | 7/1991 | Herron et al. | 439/372 |
| 5,058,045 | 10/1991 | Ma | 361/683 |
| 5,105,338 | 4/1992 | Held | 361/683 |
| 5,107,401 | 4/1992 | Youn | 361/683 |
| 5,187,645 | 2/1993 | Spalding et al. | 361/393 |
| 5,212,628 | 5/1993 | Bradbury | 361/683 |
| 5,227,953 | 7/1993 | Lindberg et al. | 361/686 |
| 5,242,056 | 9/1993 | Zia et al. | 206/576 |
| 5,251,105 | 10/1993 | Kobayashi et al. | 361/683 |

FOREIGN PATENT DOCUMENTS

| | | |
|---|---|---|
| 62-162723 | 10/1987 | Japan . |
| 2-149437 | 12/1990 | Japan . |
| 3-121427 | 12/1991 | Japan . |
| 5-12154 | 2/1993 | Japan . |
| 5-16336 | 3/1993 | Japan . |
| 5-20132 | 3/1993 | Japan . |
| 5-40938 | 6/1993 | Japan . |
| 5-204539 | 8/1993 | Japan . |
| 5-66726 | 9/1993 | Japan . |
| 5-87620 | 11/1993 | Japan . |

*Primary Examiner*—Chuong Dinh Ngo
*Attorney, Agent, or Firm*—McDermott, Will & Emery

[57] ABSTRACT

In a computer system comprising a portable computer 100 of a substantially rectangular shape having at least a first side portion 101 and a second side portion 102 and peripheral apparatuses 200 and 300 connectable thereto, the area of the portable computer is at least 182×257 mm or less and 140×216 mm or more, and among the peripheral apparatuses, the first peripheral apparatus 200 is attached to the first side portion 101 of the portable computer 100 while the second peripheral apparatus 300 is attached to the second side portion 102 of the portable computer 100, and outer dimensions A and B of the computer system, to the side portions of which the peripheral apparatuses 200 and 300 are attached, are approximately equal to those of American letter size paper, whereby the computer system and documents of American letter size can be stored side-by-side in an American letter size carrying case.

18 Claims, 9 Drawing Sheets

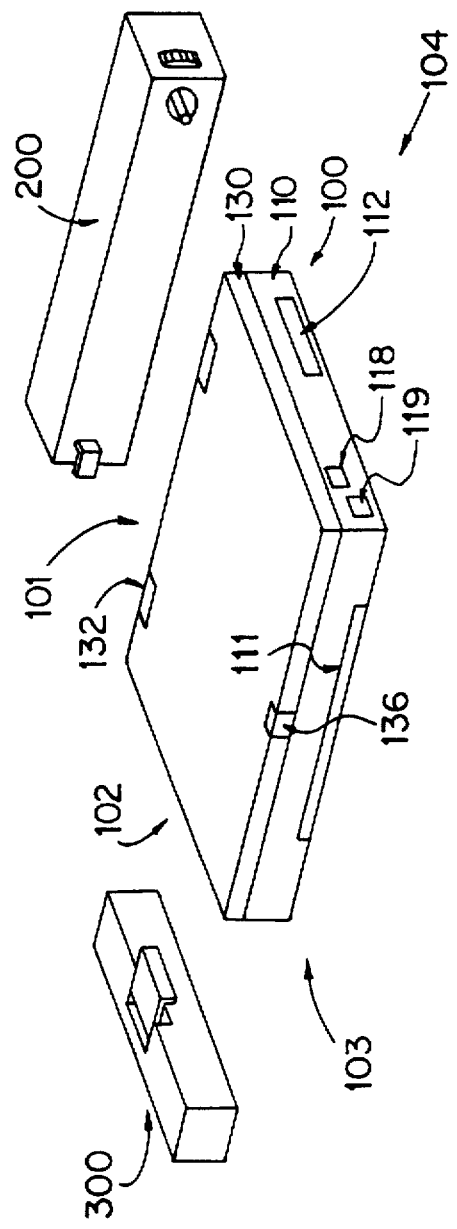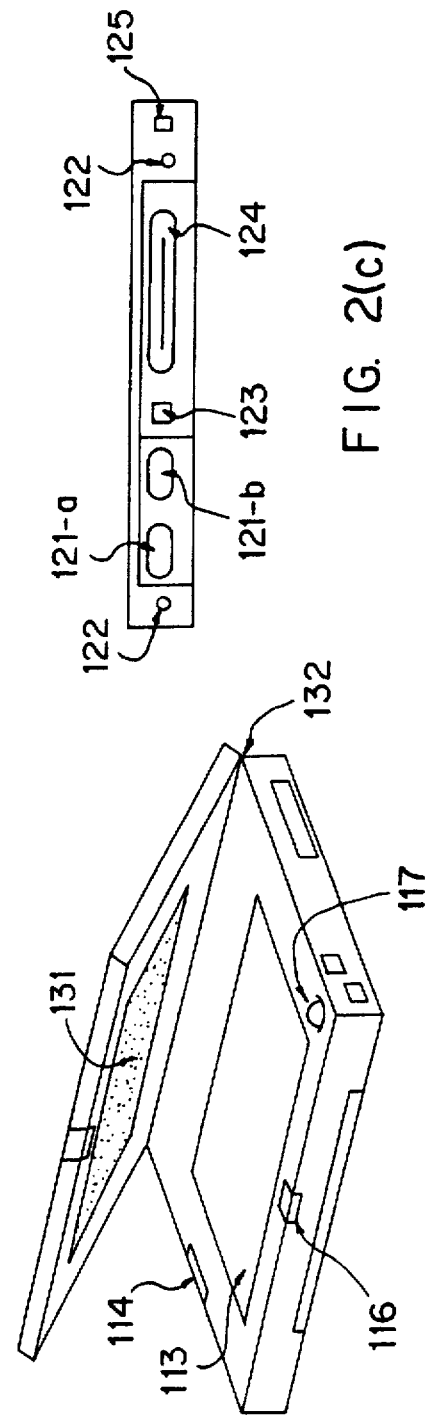

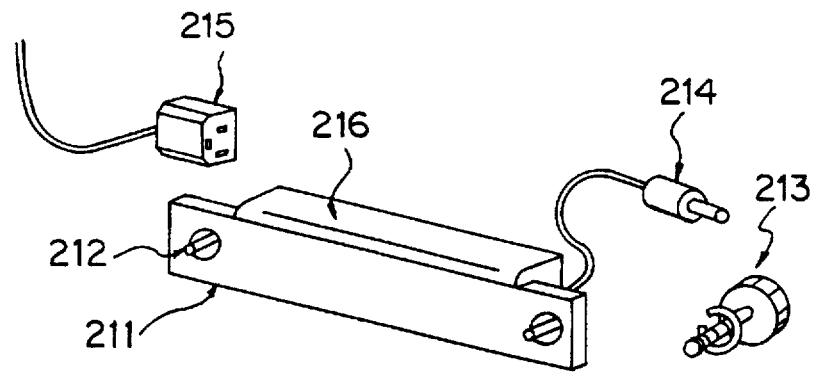
FIG. 3(a) 210 AC ADAPTER
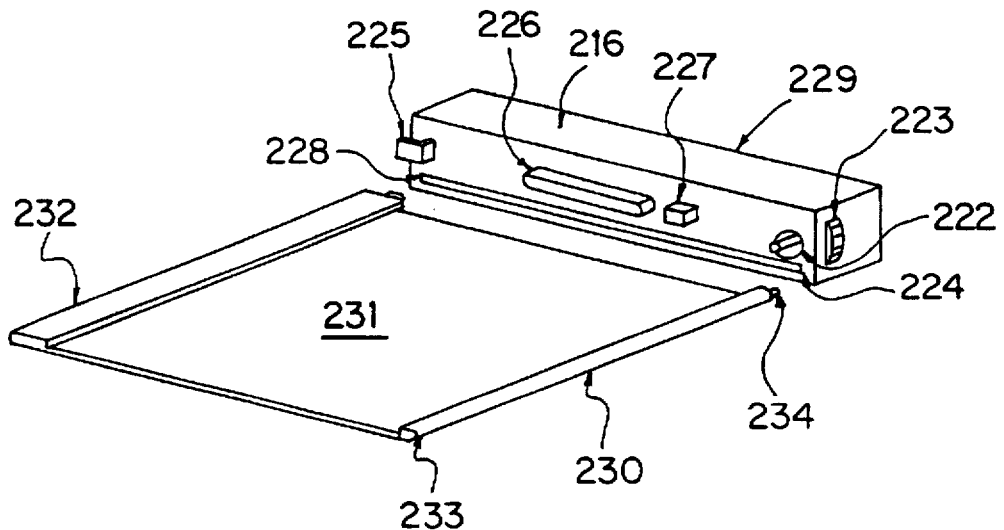
FIG. 3(b) 220 PRINTER
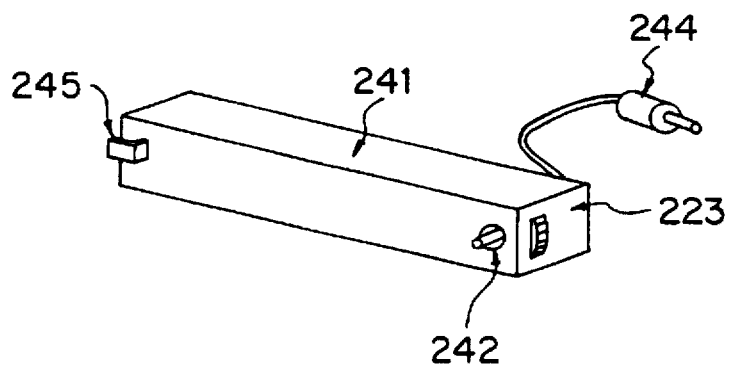
FIG. 3(c) 240 AUXILIARY POWER SUPPLY

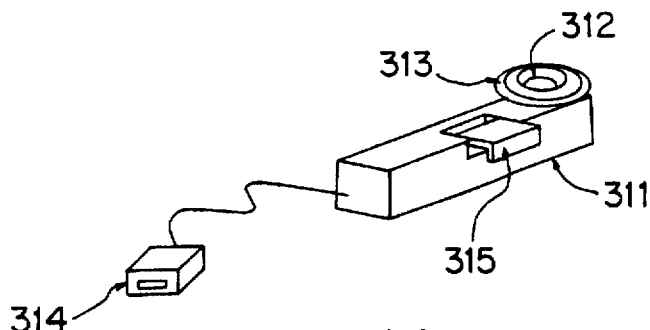
FIG. 4(a) 310 CCD CAMERA
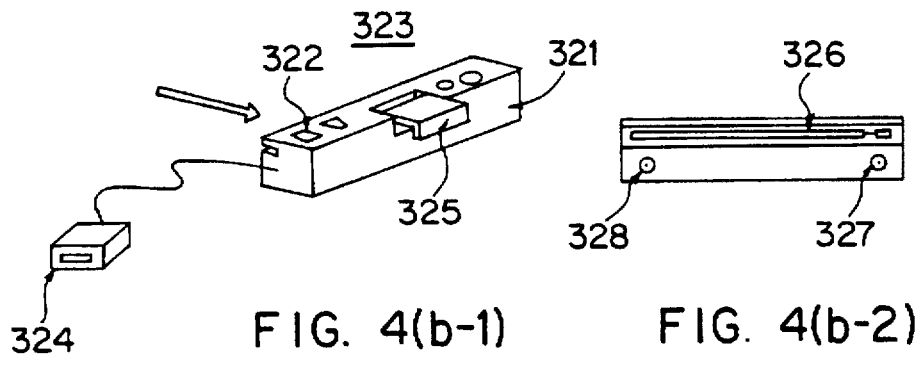
FIG. 4(b-1)     FIG. 4(b-2)
320 TV TUNER
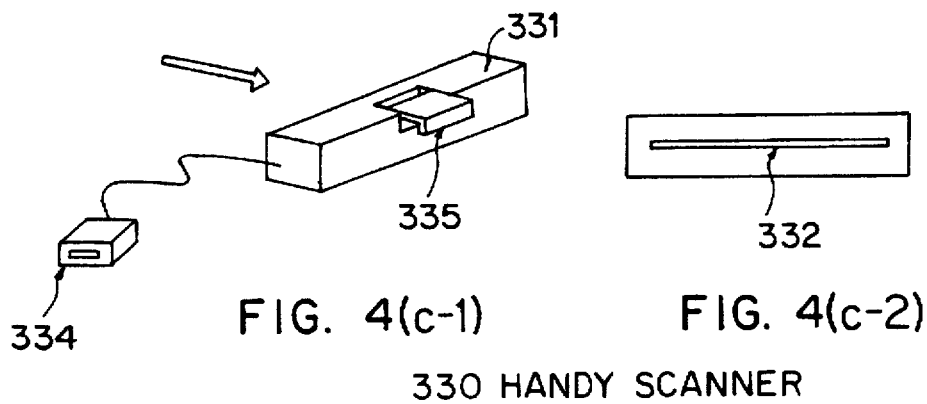
FIG. 4(c-1)     FIG. 4(c-2)
330 HANDY SCANNER
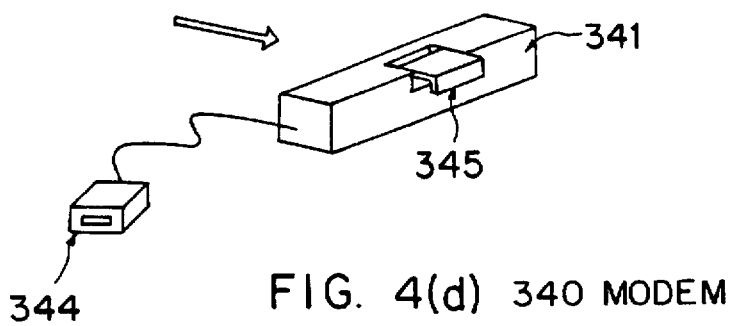
FIG. 4(d) 340 MODEM

COMPUTER SYSTEM

This application is a continuation of application Ser. No. 08/371,560 filed Jan. 11, 1995 now abandoned.

BACKGROUND OF THE INVENTION

1. Field of the Invention

The present invention relates to a computer system which is utilized by connecting peripheral apparatuses to a portable computer.

2. Description of the Related Art

Generally, a computer system comprises a portable computer having an arithmetic and logic unit including a CPU, a memory and the like, and an input-output device such as a display device wherein inputting operations can be performed by a keyboard or pen input, and separately provided peripheral apparatuses which are utilized by being connected to the portable computer. Such peripheral apparatuses are, for example, input-output devices such as a printer, a CCD camera, or a TV tuner, and a power supply device such as an AC adapter, which are connected to the portable computer in accordance with their purpose.

The purpose of this computer system lies in that it is carried to various locations and used at those locations rather than used in a state in which it is fixed to a certain location. Normally, portable computers and peripheral apparatuses accordance to purpose of use are stored in a carrying case such as an attache case or a brief case to be moved to the place where they are to be used, and the portable computer and peripheral apparatuses are utilized at that place by being taken out and connected together.

Generally, since paper comes to mind as an object to be stored in a carrying case such as an attache case or brief case, the size thereof is often determined by a predetermined paper size. For example, American attache cases may be formed in sizes able to store American letter size paper in two side-by-side rows. Otherwise, in an attache case or brief case etc. which is meant to store paper having a predetermined size such as A-4 size, the size of the case is naturally determined by the paper size. Note that A-series size or B-series size designates a paper size prescribed by JIS (Japanese Industrial Standards).

Conventionally, where a portable computer, peripheral apparatuses and paper are to be stored in a carrying case which is produced to meet such a prescribed paper size, since the length-to-width area of a portable computer such as a so-called notebook computer is approximately A-4 size (210×297 mm), it is not possible to store the notebook computer and paper of American letter size arranged horizontally in an American attache case capable of accommodating paper of American letter size (216×279 mm) in two side-by-side rows.

On the other hand, in recent times, so-called sub-notebook computers of a size smaller than American letter size have been commercialized. In the case of a computer of, for example, B-5 size (182×257 mm), an allowance of approximately 22 mm in the longitudinal direction and 28 mm in the latitudinal direction is produced with respect to American letter size. However, peripheral apparatuses which conform to this horizontal space have not yet been commercialized, therefore the total size of a computer system combining a portable computer and peripheral apparatuses exceeds the prescribed size. Therefore, it is not possible to store such a computer system and paper side-by-side inside such a carrying case, so that they must be stored therein in a state wherein the computer system and the paper overlap. However, where the computer system and the paper are accommodated in an overlapped state, since there is little flexibility in the thickness of the carrying case, the number of sheets of paper which can be stored is restricted, due to which the case lacks practicality.

Further, in a carrying case the size of which is determined so as to store paper of a prescribed paper size arranged side-by-side, since the total size of the computer system exceeds the prescribed paper size, the remaining storage space excluding the computer system is restricted by the total size of the computer system, limiting the amount and size of objects which can be stored therein, and seriously hindering the effective usage thereof.

FIG. 6 shows a storage state of a conventional computer system in a carrying case. In FIG. 6, a computer system 1 comprises a portable computer 100, a first peripheral apparatus 200 and a second peripheral apparatus 300, which are stored in a carrying case 3 in an assembled state. In FIG. 6, the first peripheral apparatus 200 is arranged adjacent to the length side of the computer 100 opposite the side in which a latch 136 is provided, and the second peripheral apparatus 300 is arranged adjacent to and opposite the short side of the portable computer 100.

Accordingly, among the outer dimensions of the computer system 1, the length of one side thereof is equal to the length of the short side of the portable computer 100 added to the length of the short side of the first peripheral apparatus 200, and the length of the other side thereof is equal to the length of the long side of the portable computer 100 added to the length of the short side of the second peripheral apparatus 300. Since these outer dimensions exceed the size of paper which the carrying case 3 is designed to store, it is not possible to store paper 2 in the remaining marginal space, so that the paper 2 must be stored in a small space in the lid portion of the case, overlapping the computer system 1. Further, the residual marginal space is of a size which is not standard and which is determined by the outer dimensions of the computer system 1, and which therefore often becomes a useless space.

As prior art examples showing relationships between a portable computer and a storage case therefor, there are, for example, U.S. Pat. No. 4,837,590 (Portable Computer and Carrying Case for Mobile Office, Glenn R. Spragne, issued Jun. 6, 1989), U.S. Pat. No. 4,896,776 (Protective Carrying Case for Data Processing Equipment, Bradley J. Kabanuk et al., filed Nov. 3, 1988), U.S. Pat. No. 5,212,628 (Modular Portable Work Station having a Movable Support Tray, George M. Bradbury, issued May 18, 1993), U.S. Pat. No. 5,227,953 (Apparatus for Retaining and Electrically Interconnecting Multiple Devices, Tom B. Lindberg et al., issued Jun. 13, 1993), U.S. Pat. No. 5,242,056 (Portable Office, Farrukh Zia et al., issued Sep. 7, 1993), U.S. Pat. No. 4,736,332 (Crease, filed April, 1988), U.S. Pat. No. 5,010,988 (Expandable Shock Protected Carrying Case, Lauren Brown, filed Mar. 19, 1990), U.S. Pat. No. 5,105,338 (Held, filed April, 1992), Japanese Unexamined Utility Model Publication No. 162723/1987 (Document Forming and Editing Device, Takahiro Iwasaka et al., Oct. 16, 1987), Japanese Unexamined Utility Model Publication No. 121427/1991 (Portable Computer Terminal Set, Toshio Oka, Dec. 12, 1991), Japanese Unexamined Utility Model Publication No. 62726/1993 (Separate Type Portable Computer, Kikou Ma, Sep. 3, 1993) and Japanese Unexamined Utility Model Publication No. 87620/1993 (Attache Case Incorporating Electric Cables for a Personal Computer, Keiji Morino, Nov. 26, 1993). Further, with respect to a portable computer provided with apparatuses on both sides thereof, there is, for example, U.S. Pat. No. 4,769,764 (Modular Computer System with Portable Travel Unit, Isaac Levanon, issued Sep. 6, 1988). Also, with respect to peripheral apparatuses and the like, there are, for example, U.S. Pat. No. 4,837,690 (Portable Computer and Carrying case for Mobile Office, Glenn R. Spragne, issued Jun. 6, 1989), U.S. Pat. No. 4,896,776 (Protective Carrying case for Data Processing Equipment, Bradley J. Kabanuk et al., filed Nov. 3, 1988), U.S. Pat. No. 5,212,628 (Modular Portable Work Station having a Movable Support Tray, George M. Bradbury, issued May 18, 1993), U.S. Pat. No. 4,769,764 (Modular Computer System with Portable Travel Unit, Isaac Levanon, issued Sep. 6, 1988), U.S. Pat. No. 4,788,658 (Apparatus for Connecting Computer Components, Charles E. Hanebath, issued No. 29, 1988), U.S. Pat. No. 4,903,222 (Arrangement of Components in a Laptop Computer system, R. Richard Cater et al., issued Feb. 20, 1990), U.S. Pat. No. 4,978,949 (Locking Mechanism and Support Legs for Removable Display Assembly, Matthew A. Herron, issued Sep. 18, 1990), U.S. Pat. No. 5,030,128 (Docking Module, Mattbew A. Herron, issued Jul. 9, 1991), U.S. Pat. No. 5,058,045 (Battery and Expansion Slot Changeable Computer, Hsi K. Ma, issued Oct. 15, 1991), U.S. Pat. No. 5,107,401 (Lap Top Computer with Tilting Mechanism Consisting of a Battery Pack Pivotally Attached on a Rear Surface, Jaesam Yoan, issued Apr. 21, 1992), U.S. Pat. No. 5,251,105 (Portable Electronic Apparatus having a Battery Pack with a Mechanism for Latching and an Independent Mechanism for Temporarily Preventing Detachment, Takaichi Kobayashi, issued Oct. 5, 1993), Japanese Unexamined Utility Model Publication No. 66726/1993 (Separate Type Portable Computer, Kikou Ma, Sep. 3, 1993) and Japanese Unexamined Utility Model Publication No. 87620/1993 (Attache Case Incorporating Electric Cables for a Personal Computer Set, Keiji Morino, Nov. 26, 1993). Further, with respect to a paper guiding tray, there are, for example, U.S. Pat. No. 4,790,431 (Carrying Case for Storing a Computer and a Printer Operatively Connected Thereto, James W. Reel, issued Dec. 13, 1988), U.S. Pat. No. 4,788,658 (Apparatus for Connecting Computer Components, Charles E. Hanebath, issued Nov. 29, 1988), Japanese Unexamined Utility Model Publication No. 12154/1993 (Printer Device, Hidemi Doi, Feb. 19, 1993) and Japanese Unexamined Utility Model Publication No. 16336/1993 (Printer, Hiroyuki Harada et al., Mar. 2, 1993). With respect to a portable computer having an engaging portion, there are, for example, U.S. Pat. No. 5,058,045 (Battery and Expansion Slot Changeable Computer, Hsi K. Ma, issued Oct. 15, 1991) and U.S. Pat. No. 5,251,105 (Portable Electronic Apparatus having a Battery Pack with a Mechanism for Latching and an Independent Mechanism for Temporarily Preventing Detachment, Takaichi Kobayashi, issued Oct. 5, 1993). With respect to installing buttons on side portions of an apparatus, there are, for example, Japanese Unexamined Utility Model Publication No. 149437/1990 (Laptop Computer, Tokumasa Ishitobi, Dec. 20, 1990), Japanese Unexamined Patent Publication No. 204539/1993 (Computer Device, Takashi Arita, Aug. 13, 1993), Japanese Unexamined Utility Model Publication No. 20132/1993 (Home Position Movable Mouse Type Pointing Device, Eiji Ito, Mar. 12, 1993) and Japanese Unexamined Utility Model Publication No. 40938/1993 (Mouse Type Pointing Device having a Fine Adjusting Mechanism, Eiji Ito, Jun. 1, 1993).

OBJECTS AND SUMMARY OF THE INVENTION

It is an object of the present invention to provide the computer system which is a combination of a portable computer and peripheral apparatuses, the outer dimensions of which conform to American letter size. Further, it is another object of the present invention to provide the computer system capable of accommodating a portable computer and peripheral apparatuses in a carrying case along with a marginal space of American letter size.

The present invention is the computer system comprising a portable computer having an approximately rectangular shape and at least a first side portion and second side portion, and peripheral apparatuses which can be connected to the portable computer. The peripheral apparatuses constituting the computer system include a first peripheral apparatus attached to the first side portion of the portable computer and a second peripheral apparatus attached to the second side portion of the portable computer, the outer dimensions of the computer system wherein the peripheral apparatuses are attached to the side portions of the portable computer conforming to American letter size, whereby the purpose of the present invention is achieved.

Also, the area of the portable computer is at least no larger than 182×257 mm and no smaller than 140×216 mm, and the area formed by connecting the first peripheral apparatus and the second peripheral apparatus to the portable computer is no larger than American letter size and approximately equal thereto.

Further, the first side portion and the second side portion of the portable computer can be either side edge portions adjacent via a corner of the portable computer or on opposite side edge portions of the portable computer.

Still further, the first peripheral apparatus is a device relating to output with respect to the portable computer or a device related to power supply, for example a printer, an AC adapter or an auxiliary power supply, while the second peripheral apparatus is a device relating to input with respect to the portable computer, for example, a CCD camera, a TV tuner, a handy scanner or a modem.

Also, the computer system wherein peripheral apparatuses are attached to the side portions thereof is stored in a carrying case capable of storing the computer system side-by-side with paper of American letter size with a remaining marginal space of American letter size for storage thereof.

Furthermore, a printer which is one of the peripheral apparatuses may be provided with a tray for guiding paper and which is attachable to the bottom face of the portable computer.

With regard to attaching the peripheral apparatuses of the portable computer, protrudable engaging portions provided on the sides of the peripheral apparatuses can be held between the main body and the lid portion of the computer. For example, the shape of the engaging portion can be formed so that the distal end thereof is bent in a substantially L-shape into an engaging protrusion, which is inserted into an opening formed on the side of the portable computer. Further, attachment can be achieved by a structure wherein a first engaging member provided on the side portion of the peripheral apparatus is engaged with a second engaging member provided on the side face of the portable computer which has a shape that engages with the first engaging member, or wherein the first engaging member is a protruding engaging portion and the second engaging member is an open portion.

Two buttons for inputting control signals can be installed on the side face portion of the portable computer, the locations of which are spaced apart in the vertical and horizontal direction on the side portion.

Further still, according to the present invention, in the computer system comprising the portable computer having the approximately rectangular shape and having at least the first side portion and the second side portion, and peripheral apparatuses which can be connected to the portable computer, the first peripheral apparatus is attached to the first side portion of the portable computer and the second peripheral apparatus is attached to the second side portion of the portable computer, and the outer dimensions of the computer system with the peripheral apparatuses attached to the side portions of the portable computer are equal to American letter size, whereby the computer system and American letter size paper can be stored side-by-side with each other in the carrying case.

The upper limit of the area of the portable computer is determined to be, for example, B-5 size (182×257 mm) which is smaller than American letter size (216×279 mm), forming a spacial allowance of 22 mm in the longitudinal direction and 28 mm in the latitudinal direction in comparison with American letter size, so that peripheral apparatuses can be stored in the allowable space. Further, when the area of the portable computer is set to be larger than the short side (216 mm) of the American letter size or the short side (210 mm) of A-4 size, a printer which can print American letter size or A-4 size can be installed as a peripheral apparatus.

Further still, the first side portion and the second side portion of the portable computer may be adjacent to each other via a corner of the portable computer or on opposite sides of the portable computer, by which means the attachment state of the peripheral apparatuses to the portable computer can be altered in various ways.

It is possible to construct a computer system by attaching peripheral apparatuses of a desired combination of an input device and an output device to the portable computer by setting the first peripheral apparatus as an output device from the portable computer or a device related to power supply and setting the second peripheral apparatus as an input device to the portable computer.

The carrying case for storing the computer system of the present invention can store the computer system and other objects and carry them as they are. For example, the size of its storage portion allows documents of American letter size to be stored side-by-side and can store the computer system with peripheral apparatuses attached to the side portions thereof side-by-side with American letter size paper.

Further, attaching of the peripheral apparatuses to the portable computer, in the present invention, can be performed by interposing and holding the engaging portion which is provided on the side of peripheral apparatus between the main body and the lid portion of the portable computer. Attaching is carried out, for example, by engaging an engaging protrusion which is formed by bending the distal end of the engaging portion in substantially an L-shape, or making the combination of a first engaging member provided on the side face portion of the peripheral apparatus, and a second engaging member provided on the side face of the portable computer having a shape that engages with the first engaging member. Alternatively, such attachment may be achieved by a structure in which the first engaging member is a protruding engaging portion and the second engaging member is an open portion, the engaging portion being held between the portable computer and the lid portion of the portable computer in a state wherein the protruding engaging portion is inserted into the open portion, thereby preventing the engaging portion from disengaging.

Further, operational performance can be improved by installing two buttons for inputting control signals on the side face portion of the portable computer the positions of which are spaced apart in the vertical and horizontal directions of the side face portion.

BRIEF DESCRIPTION OF THE DRAWINGS

FIG. 2 illustrates positional relationships between a portable computer and peripheral apparatuses of the computer system according to the present invention;

FIG. 3 is structural views of a first peripheral apparatus;

FIG. 4 is structural views of a second peripheral apparatus;

DETAILED DESCRIPTION OF THE PREFERRED EMBODIMENTS

An explanation of the embodiments of the present invention will now be given with reference to the drawings.
(Structure of computer system)

Figure 1:
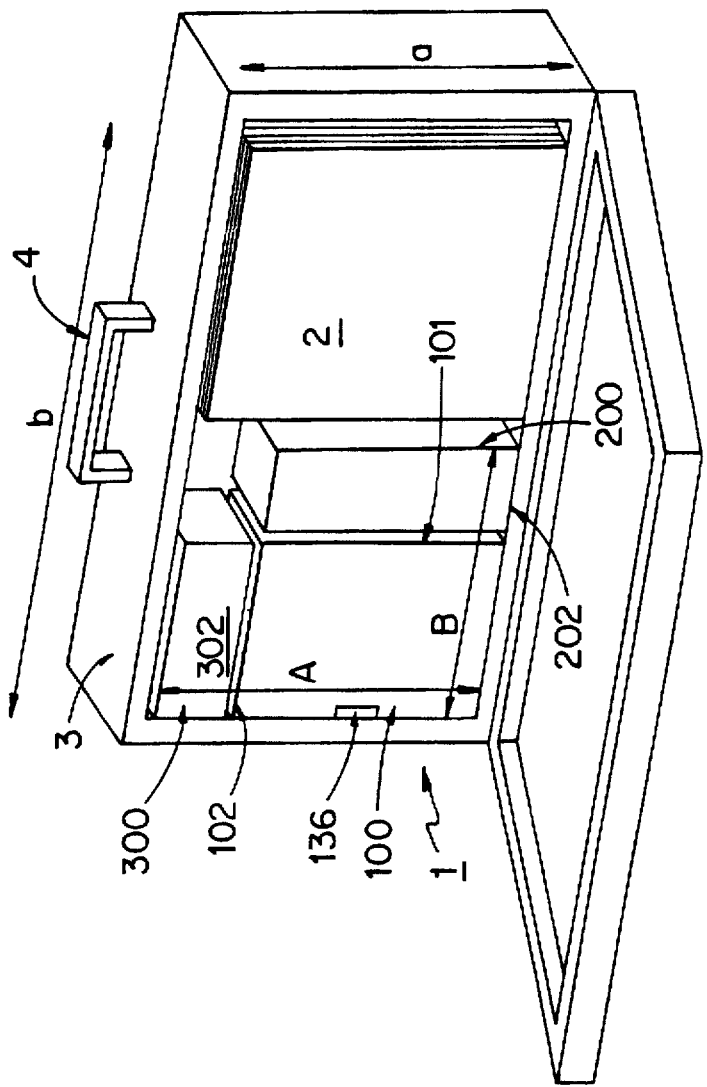
FIG. 1 is a view showing a state wherein a computer system according to the present invention is stored in a carrying case.

FIG. 1 is a view showing a state wherein a computer system according to the present invention is accommodated in a carrying case. In FIG. 1, a computer system 1 comprises a portable computer 100, a first peripheral apparatus 200 and a second peripheral apparatus 300. The first peripheral apparatus is arranged facing and adjacent to a first side portion 101 (the long side in FIG. 1) of the portable computer 100 on the side opposite a latch 136, while the second peripheral apparatus 300 is arranged facing and adjacent to a second side portion 102 (the short side in FIG. 1) of the portable computer 100, both peripheral apparatuses being stored in a carrying case 3.

In the portable computer 100 attached the peripheral apparatuses, among the outer dimensions of the computer system 1, the length of one side (hereinafter, first side portion B) is the length of the second side portion 102 (the short side in FIG. 1) of the portable computer 100 plus the length of a short side 202 of the first peripheral apparatus 200, while the length of the other side (hereinafter, second side portion A) is the length of the first side portion 101 (the long side in FIG. 1) of the portable computer 100 plus the length of a short side 302 of the second peripheral apparatus 300. Further, the lengths of the first side portion B and the second side portion A are set conform to the corresponding lengths of American letter size paper.

In this way, in the computer system of the present invention, in a case where the inner dimensions of the carrying case allow paper of American letter size to be stored side-by-side, the length of the first side portion A is set to be approximately equal to a length "a" of one inner side of the carrying case 3 and the length of the second side portion B is set to be half the length "b" of the other inner side of the portable accommodation case 3. Further, the above dimensions can include margins for extra storage in cases where the computer system 1, and the computer system 1 and paper 2, side-by-side, are stored in the carrying case 3.

Accordingly, although the arrangement of the computer system 1 in the carrying case 3 is arbitrary, means of the above structure can make the computer system and the paper be effectively stored without forming useless extra space, and make the computer system and paper of the American letter size be stored side-by-side by arranging it at either the left or right side portion in the carrying case 3 alongside the paper 2, as shown in FIG. 1.

The peripheral apparatuses are stored in the carrying case while being carried and, when they are to be used, are taken out of the carrying case, detached from the portable computer and used in their respective modes.

Further, it is possible to attach the first peripheral apparatus 200 to the portable computer 100 on a side portion opposite to the first side portion 101, or to attach the second peripheral apparatus 300 to the portable computer 101 on a side portion opposite to the second side portion 102. The computer system 1 can in this way be similarly stored in the carrying case 2 with these alternative attachment positions.

Explanation has been given on the premise that the first side portion and the second side portion are side portions not parallel with each other. However, the computer system of the present invention is not restricted to this example, and the first side portion and second side portion may be on either side of the portable computer, parallel with each other.

The maximum limit of the area of the portable computer may be a size smaller than American letter size (216×279 mm), for example B-5 size (182×257 mm), whereby a clearance of 22 mm in the longitudinal direction and 28 mm in the latitudinal direction are formed with respect to American letter size, in which peripheral apparatuses can be stored. Further, the minimum limit of the area of the portable computer may be a size larger than the short side (216 mm) of American letter size or the short side (210 mm) of A-4 size, whereby it is possible to print American letter size or A-4 size paper with a printer provided as a peripheral apparatus.

Further, a specific example of a size of the computer system 1 is the aforementioned American letter size. In the case of the carrying case known as an American attache case, which is known as a case capable of accommodating documents of American letter size side-by-side, the length of one side of the computer system is equal to the length of one side of the case, and the length of the other side of the computer system is equal to half the length of the other side of the case. Half of the case is occupied by the computer system of the present invention and the remaining half accommodates American letter size paper, so that the internal space of the case can accommodate documents of American letter size alongside the computer system.

Further, the size of the computer system 1 is not restricted to the above example, and may correspond to a carrying case of A-series or B-series size, determined in accordance with the size of the case in which the computer system 1 comprising the portable computer 100 and the peripheral apparatuses 200 and 300 attached thereto are stored.

Next, an explanation will be given of the attachment of the peripheral apparatuses 200 and 300 to the portable computer 100 in reference to FIG. 2, which shows the positional relationships between the portable computer and the peripheral apparatuses of the computer system of the present invention. (a) in FIG. 2 shows the relationship of attachment positions of the peripheral apparatuses 200 and 300 with respect to the portable computer 100. The first peripheral apparatus 200 is attached to the first side portion 101 (the long side in figure) of the portable computer 100 and the second peripheral apparatus 300 is attached to the second side portion 102 (the short side in figure) of the portable computer 100. Means for attaching the peripheral apparatuses will be mentioned below.

Next, an explanation will be given of the details of the portable computer 100 and the peripheral apparatuses 200 and 300 constituting the computer system of the present invention.

(Structure of portable computer) In FIG. 2, (a), (b) and (c) show the structure of the portable computer, (a) and (b) in FIG. 2 being perspective views of the portable computer, (a) showing a state wherein a cover portion having a display portion of the portable computer is closed and (b) showing a state wherein the cover portion is open. Further, (c) in FIG. 2 shows an elevation view of a rear portion of the portable computer.

The portable computer 100 has a substantially rectangular shape and comprises a first portable computer 110 having an arithmetic device such as a CPU, memory or the like comprising an arithmetic portion or a control portion, and a keyboard 113 which is one of input means, and a second portable computer 130 having a display portion 131 having an input function by way of a pen input. The first portable computer 110 and the second portable computer 130 are attached to each other such that they can be opened and closed by a hinge 132, and are fixed together in a closed state by engaging a latch 136 provided on the rim of the second portable computer 130 with a latch engaging portion 116 provided on the rim of the first portable computer 110. Further, the display unit 131 is formed by, for example, a liquid crystal display means or the like, and can display characters, letters, images etc.

In FIG. 2, on the upper face of the first portable computer 110 are installed the keyboard 113 and a track ball 117, and at the rim portion thereof are formed a peripheral apparatus attachment portion 114 and the latch engaging portion 116. The installation position of the track ball 117 is at a location which facilitates the operation of the track ball, for example, in the vicinity of the rim of a second side portion 102 or 104 of the first portable computer 110, where it can be operated by thumb when a user is using the first portable computer 110 and his hand is on the second side portion 102 or 104. Accordingly, when the track ball 117 is disposed on the upper face of the first portable computer 110 in the vicinity of the rim of the second side portion 104 as shown in (b) in FIG. 2, it is mainly operated by the right hand, and when it is disposed in the vicinity of the rim of the second side portion 102, it is mainly operated by the left hand.

Designating a side portion which is the front side when the portable computer 110 is arranged in a normally used position as the first side portion 103, and a side portion of the opposing rear side as the first side portion 101, in figures a battery pack 111 for storing a built-in battery is exposed to the first side portion 103, and on the rear face of the first side portion 101 is formed a structure for attaching the first peripheral apparatus 200 such as a set of connectors for an external output connector 121-a, an external input/output connector 121-b, a printer power supply connecter 123, a printer connector 124 etc., attaching holes 122, a groove for a hook 125 or the like. Further, the printer power supply connector 123 is a connector for supplying power to the printer, and can be used as a connector for supplying power not only to the printer but from the portable computer 100 to the first peripheral apparatus 200 which does not itself incorporate a power supply.

Further, a peripheral apparatus attaching portion 114 for attaching the second peripheral apparatus 300 is formed in the second side portion 102 of the portable computer 100. A card slot 112, an instruction execution button 118 and an instruction interrupt button 119 are provided on the second side portion 104. The card slot 112 is an opening for inserting a card-shaped element such as a standard IC card or the like. The instruction execution button 118 and the instruction interrupt button 119 are buttons for inputting control instructions by the track ball 117. The instruction execution button 118 and the instruction interruption button 119 are disposed displaced on the face of the second side portion 104 in the vertical and horizontal directions with respect to the first portable computer 110. In (b) in FIG. 2, the instruction execution button 118 is disposed at a position which is upwardly and displaced rearward from the instruction interruption button 119. The displaced positions of the two buttons are arranged so that, in using the track ball 117 in normal computer processes, the instruction execution button 118, which is more frequently used, can be pushed by the forefinger or middle finger. In figures, the track ball 117, the instruction execution button 118 and the instruction interruption button 119 are installed on the right hand side of the portable computer 100. However, conversely, they can be installed on the left hand side thereof or both sides thereof, in which cases also, the instruction execution button 118 and the instruction interruption button 119 may be displaced from each other.

(Structure of first peripheral apparatus)

The first peripheral apparatus 200 is a device related to an output or power supply of the portable computer 100 and is, for example, an AC adaptor 210, a printer 220 or an auxiliary power supply 240. FIG. 3 is structural views of the first peripheral apparatus 200, while (a) in FIG. 3 is a perspective view of an AC adapter, (b) in FIG. 3 is a perspective view of a printer, and (c) in FIG. 3 is a perspective view of an auxiliary power supply.

The AC adapter 210 is a device for converting an alternating current from an external power supply into a direct current and supplying it to the portable computer 100, which comprises, as shown in (a) in FIG. 3, a main body 211 of the AC adapter, a power supply plug 215 connected to an external power supply, not shown, and a main body connector plug 214 for connection to the portable computer 100. The main body 211 of the AC adapter is provided with attaching screws 212, and can be attached to the portable computer 100 by engaging the attaching screws 212 with attaching holes 122 formed on the rear face of the first portable computer 110 of the portable computer 100. E-rings, for example, can be employed as the attaching screws 212. Further, an offset portion 216, which prevents the second portable computer 130 from contacting the main body 211 of the AC adapter when the second portable computer 130 is opened, is formed in a portion of the main body 211 of the AC adapter shown in (a) in FIG. 3.

The printer 220 is an output device which performs printing on paper and comprises a printer main body 221 and a tray 230 as shown in (b) in FIG. 3. On a surface of the printer main body 221 facing the first side portion 101 of the portable computer 100 are formed terminals such as a connector 226 and a power supply connector 227, openings such as a paper entrance groove 228 for taking in paper for printing and a paper exit groove 229 (not shown), attachment means such as an attaching screw 222 and a hook 225, and attachment grooves 224 for attaching the tray 230. The connector 226 is a terminal for connecting to the printer a connector 124 of the portable computer 100 and inputting to the printer output signals for printing from the portable computer 100, and the power supply connector 227 is a terminal which connects to the printer power supply connector 123 of the portable computer 100 and receives power for printing from the portable computer 100. Further, attachment of the printer main body 221 to the portable computer 100 is performed by engaging the hook 225 with the groove 125 (FIG. 2(c)) of the portable computer 100, inserting the attaching screw 221 into one of the attaching holes 122 of the portable computer 100, and turning a fixing screw 223.

Further, the tray 230 comprises a paper guide face 231 for supporting paper for printing, a first paper guide 232 and a second paper guide 233 on both sides of the guide face for guiding paper in the direction of the paper entrance groove 228, and attachment protrusions 234 at the end portions of the paper guide face 231. The tray 230 is attached to the printer main body 221 by fitting the attaching protrusions 234 to the attaching grooves 224 formed in the printer main body 221.

Paper for printing passes through a gap formed between the paper guide face 231 and the bottom face of the portable computer 100, is inserted into the opening of the paper entrance groove 228 being guided by the first paper guide 232 and the second paper guide 233 and, after printing, exits from the paper exit groove 229, not shown, to the exterior of the printer main body 221.

The auxiliary power supply 240 is a device for supplying a direct current voltage to the portable computer 100 and comprises a main body connecting plug 244 for connecting with the portable computer 100 as shown in (c) in FIG. 3. Attaching operation of the auxiliary power supply 240 to the portable computer 100 is performed by engaging a hook 245 with the groove 125 of the portable computer 100, inserting an attaching screw 242 into one of the attaching holes 122 of the portable computer 100, and turning a fixing screw 243.

(Structure of second peripheral apparatus)

The second peripheral apparatus 300 is a device related to input to the portable computer 100 and is, for example, a CCD camera 310, a TV tuner 320, a handy scanner 330, a modem 340 or the like. FIG. 4 is structural views of the second peripheral apparatus 300, wherein (a) in FIG. 4 is a perspective view of a CCD camera, (b) in FIG. 4 is a perspective view of a TV tuner, (c) in FIG. 4 is a perspective view of the handy scanner 330 and (d) in FIG. 4 is a perspective view of the modem 340.

The CCD camera 310 is an input device for inputting image signals to the portable computer 100, and comprises a CCD camera main body 311 and a connection terminal 314 for inputting image signals to the portable computer 100, as shown in (a) in FIG. 4. The CCD camera main body 311 is provided with an image input portion comprising a plurality of CCD (charge coupled device) elements, a lens system 312 for focusing images on the plurality of CCD elements, an adjusting knob 313 for adjusting aperture etc., and an engaging portion 315 for attaching the CCD camera main body 311 to the portable computer 100. Attaching operation of the CCD camera main body 311 to the portable computer 100 by means of the engaging portion 315 will be described later.

Image signals inputted by the CCD camera 310 are image-processed in the portable computer 100 and can be displayed on the display unit 131 as a dynamic or static image. Reception of images by the CCD camera main body 311 is performed by facing the lens system 312 toward an object, focussing the image on the CCD elements and converted it into image signals, and outputting the image to the display unit 131 of the portable computer 100. Further, the received image is adjusted by means of the adjusting knob 313 while looking at the image on the display unit 131. Further, it is possible to store the image signal as a still image in a memory incorporated in the portable computer 100.

The TV tuner 320 is an input device for receiving television signals and selecting a desired channel, and comprises a TV tuner main body 321 and a connecting terminal 324 for inputting received signals to the portable computer 100, as shown in FIG. 4(b). On the TV tuner main body 321, the top face (refer to left drawing (b-1) in FIG. 4) is provided with buttons such as a volume operating button 322, a channel selection operating button 323 and the like for selecting television signals to be received, controlling volume and the like, and its side faces (refer to right drawing (b-2) in FIG. 4) are provided with an antenna 326 for receiving television signals, a video recorder output terminal 327 for outputting the received television signals to another device, an external antenna input terminal 328, and an engaging portion 325 for attaching the TV tuner main body 321 to the portable computer 100. Attaching operation of the TV tuner main body 321 to the portable computer 100 by means of the engaging portion 325 will be described later.

Note that the antenna 326 is retractably and rotatably attached to the TV tuner main body 321 at the base of it, can be fitted into a groove formed in the TV tuner main body 321, and can be drawn out from the TV tuner main body 321 by extracting it from the inside of the groove when in use.

The handy scanner 330 is an image input device, and comprises a handy scanner main body 331 and a connecting terminal 334 for inputting received signals to the portable computer 100 as shown in (c) in FIG. 4. The handy scanner main body 331 is provided with CCD arrays for inputting an image on the side face of it, image signals being received by aligning the CCD arrays on the paper or the like to be input and scanning the image by moving the handy scanner main body 331 itself over the paper. Further, the handy scanner has an engaging portion 335 for attaching the main body 331 thereof to the portable computer 100 in a similar manner to the CCD camera 310 and the TV tuner 320. Attaching operation of the handy scanner main body 331 to the portable computer 310 by means of the engaging portion 335 will be described later.

The modem 340 is a conversion device for performing conversion between the portable computer 100 and a telephone line for data communication, and comprises, as shown in (d) in FIG. 4, a modem main body 341, a connecting terminal 344 for inputting received signals to the portable computer 100 and a connector (not shown) for connecting a telephone line side terminal. Voice signals transmitted from the telephone line side are converted into electrical signals of a mode which can be processed by the portable computer 100 via the modem 340, and are inputted to the portable computer 100 through the connecting terminal 344, while conversely, electric signals output from the portable computer 100 are converted into voice signals of a bandwidth which can be transmitted by the telephone line and are output to the telephone line side.

Note that, with respect to the modem, a normal modem card may be inserted into the card slot 112 formed on the side portion of the portable computer 100 without using said modem 340. Also, as in the second peripheral apparatus 300, the modem 340 has an engaging portion 345 for attaching the modem main body 341 to the portable computer 100. Attaching operation of the modem main body 341 to the portable computer 100 by means of the engaging portion 345 will be described later.

From among the above peripheral apparatuses, it is possible to construct a computer system by attaching peripheral apparatuses in a desired input and output device combination to the portable computer, such as by taking the first peripheral apparatus as a device related to output from the portable computer or a power supply, and taking the second peripheral apparatus as a device related to input into the portable computer.

(Attaching peripheral apparatuses to portable computer)

Next, an explanation will be given concerning the attaching operation of the peripheral apparatuses such as the second peripheral apparatus 300 and the like to the portable computer 100, using FIG. 5.

The attaching operation is performed by using an engaging portion 33 provided on the side of a peripheral apparatus 30. The engaging portion 33 is slidably attached to a notched groove 31 forming a notch at the rim of the top surface of the peripheral apparatus 30 such that it can be extracted from a side portion of the peripheral apparatus 30 parallel with the top face. Further, the front end thereof protruding from the side portion of the peripheral apparatus 30 is formed with an engaging protrusion 32 which is bent in an L-shape. The engaging protrusion 32 is moved by sliding the engaging portion 33 itself along the edges of the notched groove 31, inserting it into the notched groove 31 at the side portion of the peripheral apparatus 30 when not engaging, and extracting it from the notched groove 31 when engaging. In the sliding movement of the engaging portion 33, for example, a clasp 34 consisting of a recess or the like formed on the top face of the engaging portion 33 may be utilized.

Meanwhile, a first portable computer 10 of the portable computer 100 is formed with a notch 11 on the top surface and side portion of an edge portion on the side to which the peripheral apparatus 30 is to be attached. An engaging groove 12 is formed in the lower surface of the notch 11 toward the bottom of the first portable computer 10, at a position and in a size whereby the protruded protrusion 30 can be inserted. Further, the notch height of the notch 11 itself is equal to at least the thickness of the engaging portion 33, such that, when engagement is performed by inserting the engaging protrusion 32 into the engaging groove 12, the top surface of the engaging portion 33 is on the same level as the top face of the first portable computer 10.

Figure 5A:
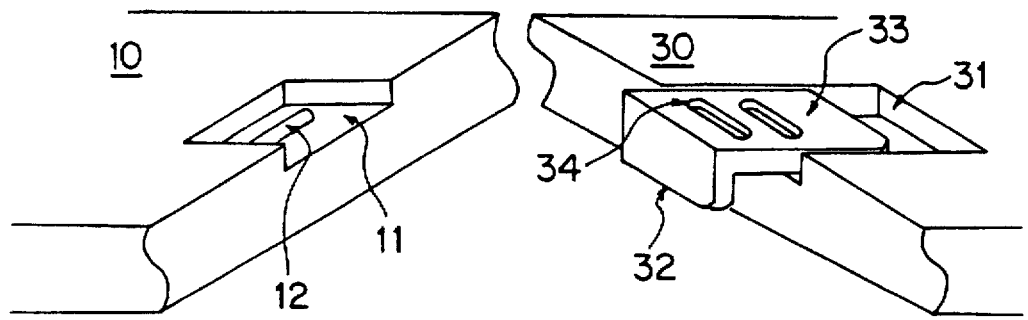
FIG. 5 illustrates attachment of a peripheral apparatus to a portable computer according to the present invention.
Figure 5B:
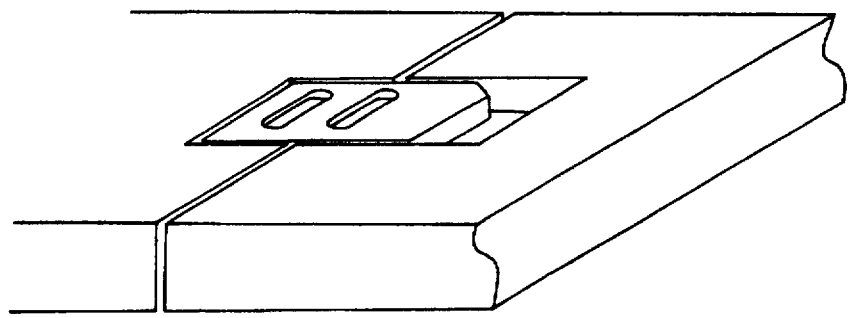
Figure 5C:
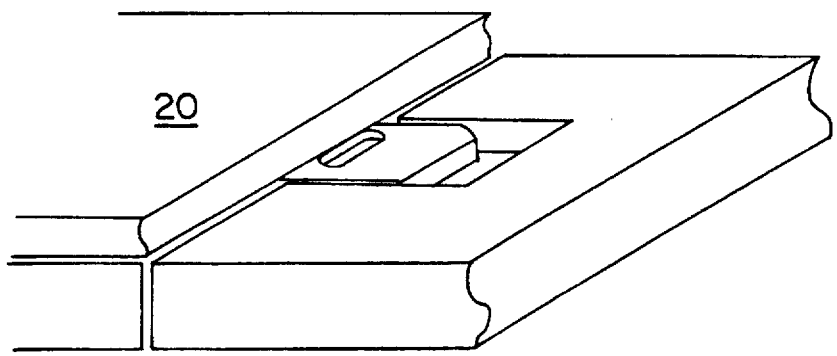
Figure 6:
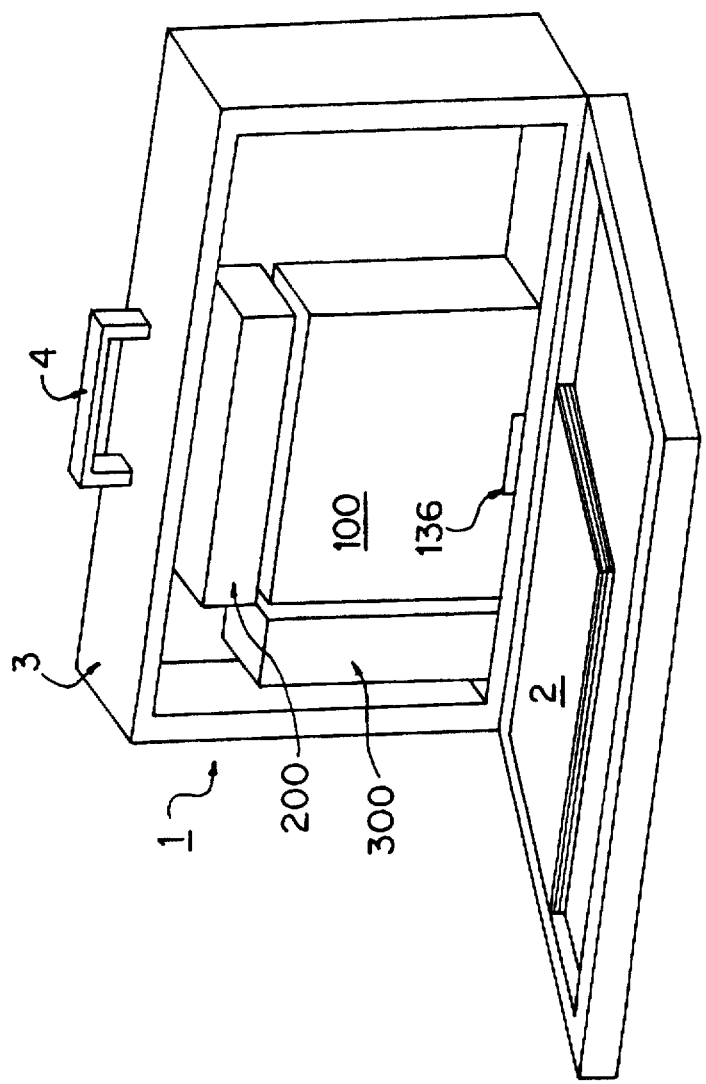
FIG. 6 is a view showing a state wherein a conventional computer system is stored in a carrying case.

(b) in FIG. 5 shows an intermediate state during attaching operation of the peripheral apparatus 30 to the first portable computer 10. Firstly, a second portable computer 20 is open, and the side portions of the peripheral apparatus 30 and the first portable computer 10 are aligned with each other such that the engaging portion 33 and the notch 11 are positioned facing each other. Then, the engaging protrusion 32 is inserted into the engaging groove 12, whereby the peripheral apparatus 30 and the first portable computer 10 are engaged. As stated above, in the engaging state, the notch height of the notch 11 is equal to the thickness of the engaging portion 33, so that the top face of the engaging portion 33 does not protrude above the top face of the first portable computer 10, and both have approximately the same height. Further, when the height position of the engaging portion 33 in the peripheral apparatus 30 is aligned with the height of the notch 11 of the first portable computer 10, the top face of the engaging portion 33 is aligned with the top face of the first portable computer 10 in a state where the peripheral apparatus 30 and the first portable computer 10 are disposed on the same plane.

Next, the second portable computer 20 is closed so that the peripheral apparatus 30 is fixed to the portable computer 100. (c) in FIG. 5 shows a state wherein the engaging protrusion 32 is engaged with the engaging groove 12 of the first portable computer 10, and the second portable computer 20 is closed over the first portable computer 10. As stated above, the top face of the engaging portion 33 does not protrude above the top face of the first portable computer 10, and therefore, it is possible to close the second portable computer 20 onto the first portable computer 10 and to latch the latch 136. By closing the second portable computer 20 onto the first portable computer 10, the engaging protrusion 32 and the front end of the engaging portion 33 are interposed between the second portable computer 20 and the first portable computer 10, and fixing operation in attaching operation is performed by engaging the latch 136.

Accordingly, the peripheral apparatus 30 does not detach from the portable computer 10 as long as the latch 32 is not disengaged and the second portable computer 20 is not opened.

Note that it is possible to form the engaging portion 33 in a continuously protruding and unslidable fixed state, or a state wherein the engaging protrusion 32 is bent upward, conversely to that in (a) in FIG. 5. When the engaging protrusion 32 is bent upward, an engaging groove for inserting the engaging protrusion 32 is formed in the second portable computer 20.

Further, when the height of the engaging portion 33 in the first portable computer 20 exceeds that of the top face of the first portable computer 20, it is possible to close the second portable computer 20 onto the first portable computer 20 by forming a notch in the second portable computer 20 corresponding to the excess height.

(Other embodiments of attachment positions for peripheral apparatuses to portable computer)

Next, an explanation will be given of other embodiments of attachment positions for peripheral apparatuses with respect to a portable computer in reference to FIGS. 7 through 10.

Figure 7:
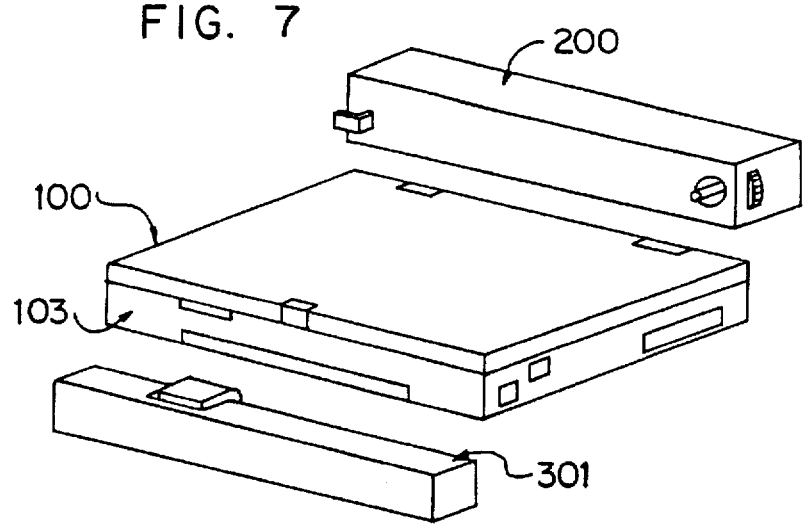
FIG. 7 is a view explaining another embodiment of attachment positions of peripheral apparatuses to a portable computer according to the present invention.

According to a second embodiment of attachment positions of peripheral apparatuses with respect to a portable computer, as shown in FIG. 7, the second peripheral apparatus 301 is attached to the first side portion 103 of the portable computer 100. Accordingly, in this example, the two opposing first side portions of the portable computer 100 have the peripheral apparatuses 200 and 301 attached thereto, the length of the first side portion A of the computer system being equal to the length of the first side portion of the portable computer 100 and the length of the second side portion B of the computer system being equal to the length of the second side portion of the computer 100 plus the lengths of the short sides of the two peripheral apparatuses 200 and 301.

Further, the length of the first side portion of the portable computer 100 and the total of the length of the second side portion of the portable computer 100 plus the lengths of the short sides of the two peripheral apparatuses 200 and 301 correspond to American letter size.

In this case, the length of the first side portion of the portable computer 100 is set to be approximately equal to one inner side "a" of the carrying case and the total of the length of the second side portion of the portable computer 100 and the lengths of the short sides of the two peripheral apparatuses 200 and 301 is set to be equal to half the length of the other inner side "b" of the carrying case 3, so that the assembly can be stored in an area which is half that of the American letter size carrying case.

Figure 8:
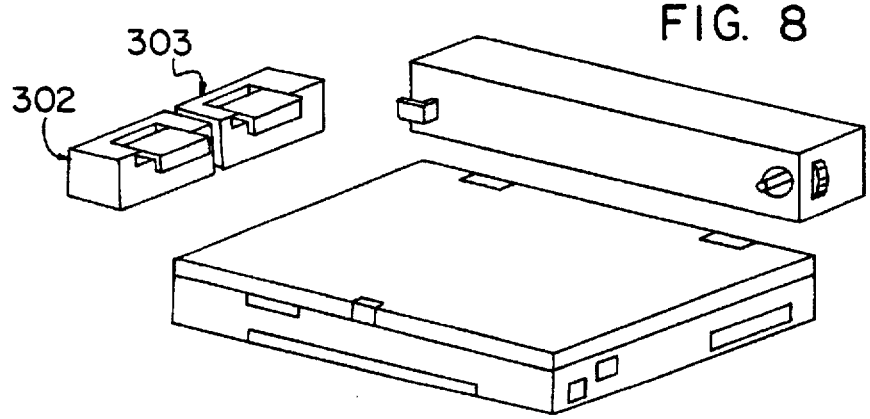
FIG. 8 is a view explaining another embodiment of attachment positions of a peripheral apparatus to a portable computer according to the present invention.

Also, according to a third embodiment of attaching positions for peripheral apparatuses to the portable computer, as shown in FIG. 8, a plurality of second peripheral apparatuses 302 and 303 are attached to the second side portion 102 of the portable computer 100. Accordingly, in this example, as in the first example, the first peripheral apparatus 200 is attached to the first side portion of the portable computer 100, and the second peripheral apparatuses 302 and 303 are attached to the second side portion of the portable computer 100. The length of the first side portion A of the computer system is equal to the total of the length of the first side portion of the portable computer 100 plus the length of the short side of the second peripheral apparatus, and the length of the second side portion B of the computer system is equal to the length of the second side portion of the portable computer 100 added to the length of the short side of the first peripheral apparatus 200.

In addition, the total of the length of the first side portion of the portable computer 100 plus the length of the short side of the second peripheral apparatus, and the length of the second side portion of the portable computer 100 added to the length of the short side of the first peripheral apparatus 200 correspond to American letter size. In this case, the total of the length of the first side portion of the portable computer 100 and the length of the short side of the second peripheral apparatus is set to be approximately equal to the length of one inner side "a" of the carrying case, and the length of the second side portion of the portable computer 100 added to the length of the short side of the first peripheral apparatus 200 is set to be equal to half the length of the other inner side "b" of the carrying case 3, so that the assembly can be stored in an area which is half that of an American letter size carrying case.

Figure 9:
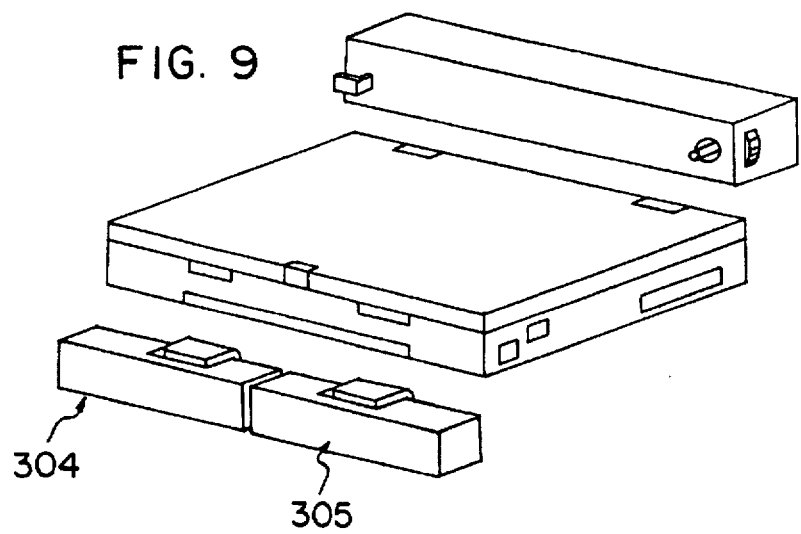
FIG. 9 is a view explaining another embodiment of attachment positions of peripheral apparatuses to a portable computer according to the present invention.

Further, according to a fourth embodiment of attaching positions for peripheral apparatuses with respect to a portable computer, as shown in FIG. 9, a plurality of second peripheral apparatuses 304 and 305 are attached to the first side portion 103 of the portable computer. Accordingly, in this example, as in the second example, the two opposing first side portions of the portable computer 100 have peripheral apparatuses 200, 304 and 305 attached thereto. The length of the first side portion A of the computer system is equal to the length of the first side portion of the portable computer 100, and the length of the second side portion B of the computer system is equal to the length of the second side portion of the portable computer 100 added to the lengths of the short sides of the two peripheral apparatuses 200 and 304 (305).

Also, the length of the first side portion of the portable computer 100 and the total of the length of the second side portion of the portable computer 100 and the lengths of the short sides of the two peripheral apparatuses 200 and 304 (305), correspond to American letter size.

In this case, the length of the first side portion of the portable computer 100 is set to be approximately equal to the length of one inner side "a" of the carrying case, and total of the length of the second side portion of the portable computer 100 and the lengths of the short sides of the two peripheral apparatuses 200 and 304 (305) is set to be half the length of the other inner side "b" of the carrying case 3, such that the assembly can be stored in an area which is half that of the inside of an American letter size carrying case.

Figure 10:
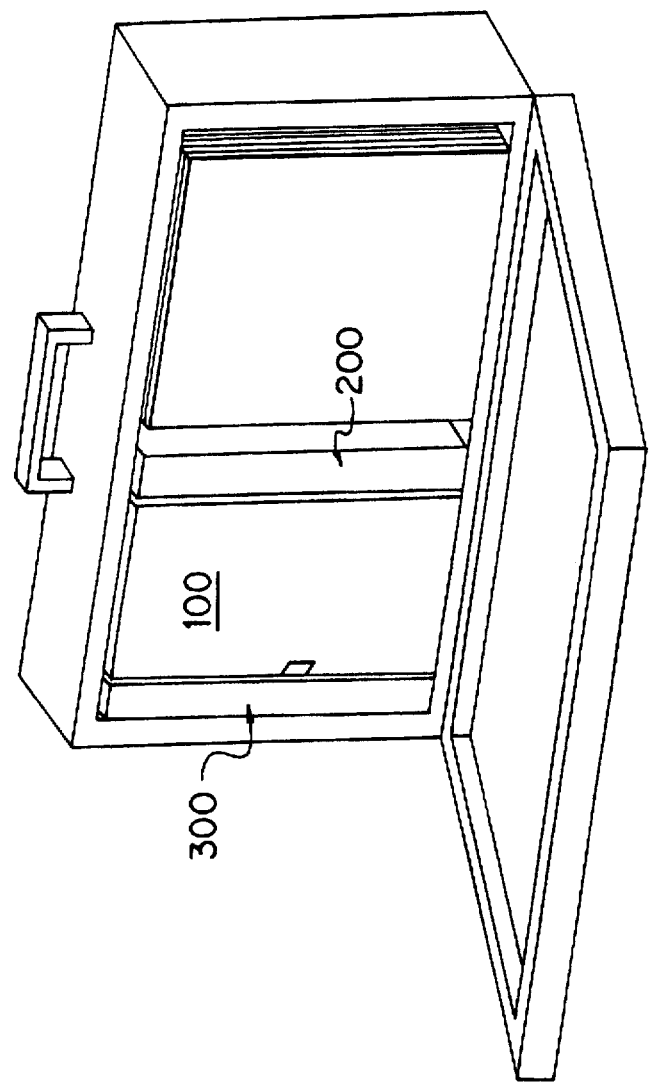
FIG. 10 is a view showing another state wherein a computer system of the present invention is stored in a carrying case.

The storage state of the carrying case in the second and fourth embodiments of positions for peripheral apparatuses with respect to the portable computer is shown in FIG. 10, which shows another storage state of the computer system of the present invention in the carrying case.

(Another embodiment for attaching peripheral apparatuses to a portable computer)

Next, an explanation will be given of other embodiment for attaching peripheral apparatuses such as the second peripheral apparatus 300 to the portable computer 100, with reference to FIG. 11.

In this embodiment, attaching operation is performed by using the engaging portion 35 provided on the side of the peripheral apparatus 30. As in the engaging portion 33 in the embodiment shown in FIG. 5, an engaging portion 35 is slidably attached in the notched groove 31 such that it can protrude from the side portion of the peripheral apparatus 30 parallel with the face of the peripheral apparatus 30. An engaging hole 36 is formed in the engaging portion 35 which differs from the engaging protrusion 32 for engaging the engaging portion 33. This engaging hole 36 is moved by sliding the engaging portion 35 along the notched groove 31, and inserting it into the notched groove 31 on the upper face of the peripheral apparatus 30 when not engaging, and extracting it horizontally from the notched groove 31 when engaging.

Meanwhile, the engaging groove 12 formed in the first portable computer 10 of the portable computer 100 is similar to that in the above embodiment, and is formed so that the position of the engaging hole 36 of the protruding engaging portion 33 conforms with the position of the opening of the engaging groove 12 when the peripheral apparatus 30 is aligned with the first portable computer 10. Further, on the lower face of the second portable computer 20, as shown in (b) in FIG. 11, an engaging protrusion 22 is formed protruding downward at a position corresponding to the opening of the engaging groove 12 of the opposing first portable computer 10 and the engaging hole 36 of the peripheral apparatus 30 when engaging is performed, and is formed in a size capable of penetrating therethrough.

As in the above embodiments, after aligning the peripheral apparatus 30 and the portable computer 10, attaching operation of the peripheral apparatus is fixed by closing the second portable computer 20.

Figure 11A:
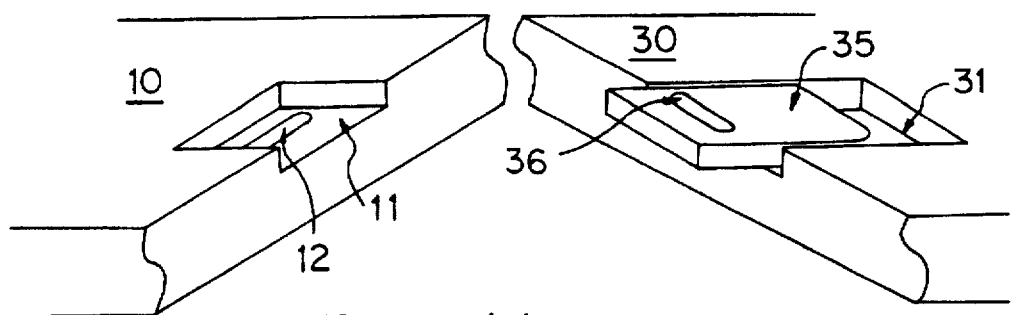
FIG. 11 illustrates another example of attaching a peripheral apparatus to a portable computer according to the present invention.
Figure 11B:
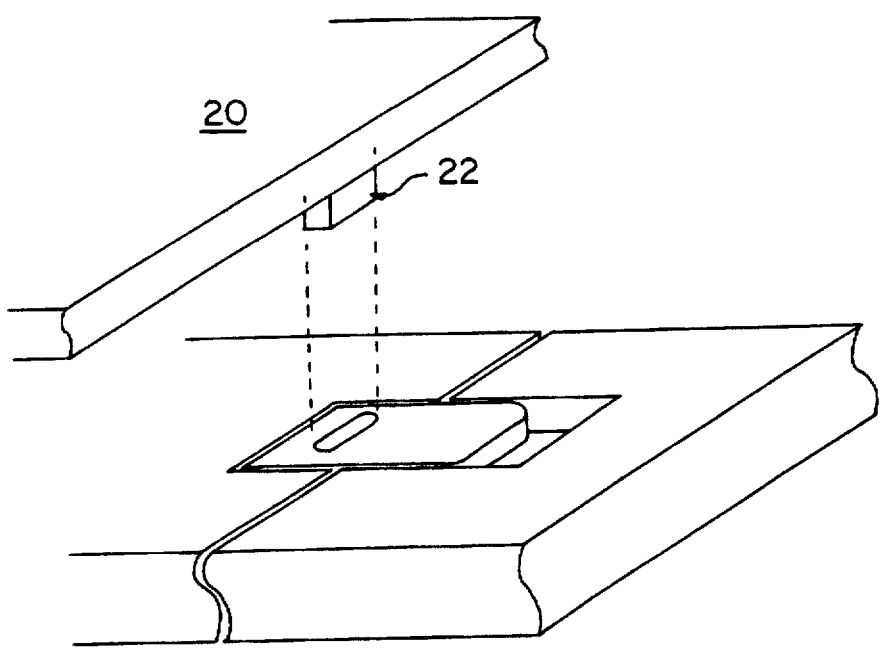
Figure 11C:
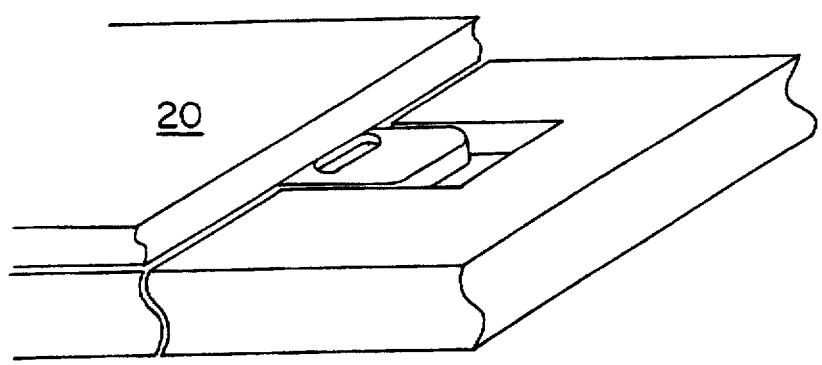

(b) in FIG. 11 shows a state wherein the peripheral apparatus 30 is being attached to the first portable computer 10. (c) in FIG. 11 shows a state wherein the second portable computer 20 is closed over the first portable computer 10, the engaging protrusion 22 penetrating the engaging hole 36 of the engaging portion 33 and the opening of the engaging groove 12 of the first portable computer 10.

When the second portable computer 20 is closed onto the first portable computer 10, the front end portion of the engaging portion 33 is interposed between the second portable computer 20 and the first portable computer 10, and the engaging portion 35 is prevented from detaching by the penetration of the engaging protrusion 22 through the engaging hole 36 and the opening of the engaging groove 12. Further, engaging the latch 136 sets a state wherein the second portable computer 20 and the first portable computer 10 are engaged with each other is fixed, by means of which the attachment is fixed.

Accordingly, the peripheral apparatus 30 does not disengage from the portable computer 10 as long as the latch 132 is not disengaged and the second portable computer 20 is not opened.

The computer system is composed by attaching the peripheral apparatuses to the portable computer in accordance with the attaching positions of the peripheral apparatuses with respect to the portable computer and by operating the attachment means, and can be stored side-by-side with paper to be stored therein, in a carrying case of a size corresponding to the prescribed paper size of the paper.

(Effect of embodiments)

According to the embodiments of the present invention, portions of the peripheral apparatuses are inserted into the openings formed in the portable computer, and portions of the peripheral apparatuses are interposed between the portable computers, by which the peripheral apparatuses can be firmly attached to the portable computer.

Further, the member of the peripheral apparatus that is employed for attaching the peripheral apparatus to the portable computer can be extracted from the peripheral apparatus by merely sliding it. Therefore, the protrusion can be stored in the peripheral apparatus when not attached.

In the computer system of the present invention, wasteful space is prevented by accommodating the computer system in the carrying case side-by-side with paper of a predetermined size, and it is possible to prevent the computer system from moving inside of the carrying case, without the need to provide means for fixing the computer system in place in the carrying case.

(Modification example)

The peripheral apparatuses can be attached to the portable computer by providing engaging members such as "Velcro" on the mutually contacting faces of the peripheral apparatuses and the portable computer and bringing the engaging members into contact.

As is apparent from the above descriptions of the embodiments of the present invention, according to the computer system of the present invention, it is possible to provide a computer system in which the outer dimensions of the computer system incorporating the portable computer and peripheral apparatuses conforms to American letter size, so that the portable computer and peripheral apparatuses can be stored in a carrying case alongside a marginal space for storing American letter size paper.

What is claimed is:

1. A computer system comprising:
   a portable computer having a substantially rectangular shape, at least a first side portion and second side portion, and peripheral apparatuses connectable to the portable computer, wherein
   the peripheral apparatuses include a first peripheral apparatus attached to the first side portion of the portable computer and a second peripheral apparatus attached to the second side portion of the portable computer,
   the outer dimensions of the computer system in which the peripheral apparatuses are attached to the side portions of the portable computer conforms to American letter size, and
   the computer system to the side portions of which the peripheral apparatuses are attached is stored in a carrying case capable of storing the computer system side-by-side with paper of American letter size, leaving a marginal space of American letter size for storage thereof.

2. The computer system according to claim 1, wherein an area of the portable computer is at least equal to or less than 182×257 mm and equal to or more than 140×216 mm, and the area formed by connecting the first peripheral apparatus and the second peripheral apparatus to the portable computer is substantially equal to American letter size.

3. The computer system according to claim 1, wherein the first side portion and the second side portion are side edge portions adjacent via a corner of the portable computer.

4. The computer system according to claim 1, wherein the first side portion and the second side portion are opposite side portions of the portable computer.

5. The computer system according to claim 1, wherein the first peripheral apparatus is a printer, an AC adapter or an auxiliary power supply.

6. The computer system according to claim 5, wherein the printer which is one of the peripheral apparatuses has a tray for guiding paper, the tray being attachable to the bottom surface of the portable computer.

7. The computer system according to claim 1, wherein the second peripheral apparatus is a CCD camera, a TV tuner, a handy scanner or a modem.

8. The computer system according to claim 1, wherein attaching operation of the peripheral apparatuses of the portable computer is performed by holding protrudable engaging portions provided on sides of the peripheral apparatuses between a main body of the computer and a cover portion of the computer.

9. The computer system according to claim 8, wherein the shape of the engaging portion is formed so that a distal end thereof is an engaging protrusion bent into a substantially L-shape, and the engaging protrusion is inserted into an opening formed on a side of the portable computer.

10. The computer system according to claim 1, wherein attachment of the peripheral apparatuses is performed by a engaging a first engaging member provided on a side portion of a peripheral apparatus and a second engaging member provided on a side face of the portable computer and having a shape which engages with the first engaging member.

11. The computer system according to claim 10, wherein the first and second engaging members are a protruding engaging portion and an open portion.

12. The computer system according to claim 1, wherein two buttons for inputting control signals are provided on a first side portion or second side portion of the portable computer, and the buttons are disposed displaced in vertical and horizontal directions with respect to the side portion.

13. A Portable computer system, comprising:

a portable computer which has a substantially rectangular shape and has at least a first side surface and a second surface, wherein said first side surface of said portable computer includes first engaging means for attaching a first peripheral apparatus, said second side surface of said portable computer includes second engaging means for attaching a second peripheral apparatus, when said first and second peripheral apparatuses are connected to said portable computer using said first and second engaging means, the portable computer and said first and second peripheral apparatuses become united, the external shape of said Portable computer and the external shape of said first and second peripheral apparatuses are such that the external shape of said united portable computer and said first and second peripheral apparatuses are substantially equal in size to a standard sized paper, so that said united portable computer and said first and second peripheral apparatuses, when stored in a carrying case with said standard sized paper arranged side by side eliminates unnecessary space between said united portable computer and said first and second peripheral apparatuses and said carrying case and prevents said united portable computer and said first and second peripheral apparatuses from moving back and forth and up and down; and wherein at least one of said first engaging means and said second engaging means is an engaging protrusion, and at least one of said first and second peripheral apparatuses is formed with a recess or notch for engaging with said engaging protrusion of the portable computer, wherein at least one of said first engaging means and said second engaging means is formed with a recess or notch, and at least one of said first and second peripheral apparatuses is provided with an engaging protrusion for engaging with said recess or notch of the portable computer, and wherein said engaging protrusion is an L-shaped member which is slidable toward and away from the recess or notch of the portable computer, and said portable computer and said at least one of said first and second peripheral apparatuses, connected to each other by means of combination of said recess or notch and said L-shaped member, have surfaces which lie in a common plane and are same in height or thickness, and wherein said L-shaped member is slidable between a stored position and a connecting position, and in said stored position said L-shaped member is non-protruding from the at least one of said first and second peripheral apparatus to which said L-shaped member is attached.

14. A portable computer system according to claim 13, wherein said L-shaped member is attached to said first peripheral apparatus and in said stored position said L-shaped member forms a portion of a side surface and an upper surface of the first peripheral apparatus.

15. A portable computer system, comprising:

a portable computer which has a substantially rectangular shape and has at least a first side surface and a second surface, wherein said first side surface of said portable computer includes first engaging means for attaching a first peripheral apparatus, said second side surface of said portable computer includes second engaging means for attaching a second peripheral apparatus, when said first and second peripheral apparatuses are connected to said portable computer using said first and second engaging means, the portable computer and said first and second peripheral apparatuses become united, the external shape of said portable computer and the external shape of said first and second peripheral apparatuses are such that is the external shape of said united portable computer and said first and second peripheral apparatuses are substantially ecual in size to a standard sized paper, so that said united portable computer and said first and second peripheral apparatuses, when stored in a carrying case with said standard sized paper arranged side by side eliminates unnecessary space between said united portable computer and said first and second peripheral apparatuses and said carrying case and prevents said united portable computer and said first and second peripheral apparatuses from moving back and forth and up and down; and wherein at least one of said first engaging means and said second engaging means is an engaging protrusion, and at least one of said first and second peripheral apparatuses is formed with a recess or notch for engaging with said engaging protrusion of the portable computer, wherein at least one of said first engaging means and said second engaging means is formed with a recess or notch, and at least one of said first and second peripheral apparatuses is provided with an engaging protrusion for engaging with said recess or notch of the portable computer, and wherein said engaging protrusion is an L-shaped member which is slidable toward and away from the recess or notch of the portable computer, and said portable computer and said at least one of said first and second peripheral apparatuses, connected to each other by means of combination of said recess or notch and said L-shaped member, have surfaces which lie in a common plane and are same in height or thickness, and wherein said L-shaped member is attached to said first peripheral apparatus and with an end of the L-shaped member in said recess or notch, an outer surface of said L-shaped member and an upper surface of said portable computer form a contiguous smooth surface.

16. A portable computer system, comprising:

a portable computer which has a substantially rectangular shape and has at least a first side surface and a second surface, wherein said first side surface of said portable computer includes first engaging means for attaching a first peripheral apparatus, said second side surface of said portable computer includes second engaging means for attaching a second peripheral apparatus, when said first and second peripheral apparatuses are connected to said portable computer using said first and second engaging means, the portable computer and said first and second peripheral apparatuses become united, the external shape of said portable computer and the external shape of said first and second peripheral apparatuses are such that the external shape of said united portable computer and said first and second peripheral apparatuses are substantially equal in size to a standard sized paper, so that said united portable computer and said first and second peripheral apparatuses, when stored in a carrying case with said standard sized paper arranged side by side eliminates unnecessary space between said united portable computer and said first and second peripheral apparatuses and said carrying case and prevents said united portable computer and said first and second peripheral apparatuses from moving back and forth and up and down;

and further comprising:

an L-shaped member slidably attached to said first peripheral apparatus for connecting said first peripheral apparatus to said portable computer; and a display rotatably mounted to said portable computer such that in a closed position said display is disposed immediately adjacent to an upper surface of said portable computer, wherein said portable computer has a groove formed in the upper surface adapted to accept an end of said L-shaped member to connect said first peripheral apparatus to said portable computer, and said display is rotatable to said closed position with said end of the L-shaped member in said groove.

17. A portable computer system, comprising:

a portable computer which has a substantially rectangular shape and has at least a first side surface and a second surface, wherein said first side surface of said portable computer includes first engaging means for attaching a first peripheral apparatus, said second side surface of said portable computer includes second engaging means for attaching a second peripheral apparatus, when said first and second peripheral apparatuses are connected to said portable computer using said first and second engaging means, the portable computer and said first and second peripheral apparatuses become united, the external shape of said portable computer and the external shape of said first and second peripheral apparatuses are such that the external shape of said united portable computer and said first and second peripheral apparatuses are substantially equal in size to a standard sized paper, so that said united portable computer and said first and second peripheral apparatuses, when stored in a carrying case with said standard sized paper arranged side by side eliminates unnecessary space between said united portable computer and said first and second peripheral apparatuses and said carrying case and prevents said united portable computer and said first and second peripheral apparatuses from moving back and forth and up and down;

and further comprising:

a display, with a protruding member extending therefrom, rotatably mounted to said portable computer such that in a closed position said display is disposed immediately adjacent to a top surface of said portable computer; and a planar member, having an hole adapted to provide a passage way for said protruding member, attached to said first peripheral apparatus for connecting said first peripheral apparatus to said portable computer, wherein said portable computer has a notch formed in an upper surface thereof adapted to accept said planar member, and a groove formed within said notch and in the upper surface adapted to accept said planar member, and with said planar member positioned in said notch said display is rotatable to the closed position such that said protruding member passes through said hole and into said groove.

18. A portable computer system according to claim 17, wherein said planar member is slidable between a stored position and a connecting position, and in said stored position said planar member is non-protruding from said first peripheral apparatus.

* * * * *